United States Patent
Shimada et al.

[11] Patent Number: 5,958,102
[45] Date of Patent: Sep. 28, 1999

[54] APPARATUS AND METHOD FOR MAKING AN OPTICAL FIBER PREFORM USING A CORRECTION PASS

[75] Inventors: Tadakatsu Shimada; Hideo Hirasawa, both of Annaka, Japan

[73] Assignee: Shin-Etsu Chemical Co., Ltd., Tokyo, Japan

[21] Appl. No.: 08/978,004

[22] Filed: Nov. 25, 1997

[30] Foreign Application Priority Data

Nov. 27, 1996 [JP] Japan ................................. 8-315900

[51] Int. Cl.⁶ .................................................. C03B 37/07
[52] U.S. Cl. .............................. 65/382; 65/421; 65/422; 65/491; 65/531
[58] Field of Search ................ 65/382, 421, 491, 65/531, 422

[56] References Cited

U.S. PATENT DOCUMENTS

| | | | |
|---|---|---|---|
| 4,294,601 | 10/1981 | Dabby | 65/382 |
| 5,192,350 | 3/1993 | Le Sergent | 65/382 |
| 5,211,732 | 5/1993 | Abbott | 65/421 |
| 5,558,692 | 9/1996 | Chervenak | 65/382 |
| 5,676,724 | 10/1997 | Barre | 65/382 |

FOREIGN PATENT DOCUMENTS

| | | |
|---|---|---|
| 41-11071 | 6/1966 | Japan. |
| 49-84258 | 8/1974 | Japan. |
| 53-70449 | 6/1978 | Japan. |
| 55-116638 | 9/1980 | Japan. |
| 56-120528 | 9/1981 | Japan. |
| 57-183328 | 11/1982 | Japan. |
| 58-9835 | 1/1983 | Japan. |
| 60-260429 | 12/1985 | Japan ................................. 65/491 |
| 1-9821 | 1/1989 | Japan. |
| 3-228845 | 10/1991 | Japan. |

OTHER PUBLICATIONS

English Abstracts of Japanese Patents 03279234, 06072735, 0416008 and 01018929, 1994.

*Primary Examiner*—John Hoffmann
*Attorney, Agent, or Firm*—McDermott, Will & Emery

[57] ABSTRACT

A method for making an optical fiber preform comprises depositing fine particles of glass serving as a dad on the surfaces of a rod-shaped core over a given length of the rod-shaped core by use of a plurality of oxyhydrogen flame burner units, detecting an amount of the resultant deposit to check uniformity in the amount of the deposit along the lengthwise direction of the rod-shaped core during the course of the deposition, and further depositing fine particles of glass on any surface portion of the rod-shaped core within the given length from at least one burner unit other than the plurality of burner units to correct the amount of the deposit over the given length based on the results of the detection. The resultant deposit is dehydrated and fired by a usual manner to obtain a preform. An apparatus for carrying out the method is also described.

10 Claims, 1 Drawing Sheet

APPARATUS AND METHOD FOR MAKING AN OPTICAL FIBER PREFORM USING A CORRECTION PASS

BACKGROUND OF THE INVENTION

1. Field of the Invention

This invention relates to a method for making an optical fiber preform which has a uniform dimension of a deposit along its leagthwise direction and is capable of being produced at a high speed. The invention also relates to an apparatus for carrying out the method.

2. Description of the Prior Art

In the initial stage of preparation of optical fiber preforms, there was used a method of covering a core glass with a glass tube clad as set out, for example, in Japanese Patent Publication No. 41-11071. Recent remarkable improvements in characteristics and precision and requirements for much larger-sized preforms have lead to methods disclosed, for example, in Japanese Laid-open Patent Application No. 49-84258. In the method of this laid-open application, a vapor phase starting material for glass is introduced into an oxyhydrogen flame of a burner to form a soot body (i.e. fine particles) of glass by hydrolysis with the flame. The soot is blown against the outer surfaces of a glass rod serving as a core, and the burner is reciprocated in axial directions in parallel to the glass rod to build up layers of the soot or fine particles of glass one by one along the radial directions to form a porous glass matrix. The matrix is heated to permit dehydration and vitrification thereby obtaining a transparent optical fiber preform.

Several improvements of this method have been proposed including a method, wherein the glass soot is continuously deposited in vertical directions, set forth, for example, in Japanese Laid-open Patent Application No. 55-116638, and a method set out, for example, in Japanese Laid-open Patent Application No. 57-183330, wherein while a core rod is reciprocated relative to a plurality of burners, different types of glass-forming materials are supplied as a porous glass matrix from the plural burners so that the composition of the glass-forming material changes every reciprocation, thereby obtaining a preform having a desired distribution of refractive indices along the radial directions. Aside from the above methods, there have also been proposed a method set out, for example, in Japanese Laid-open Patent Application No. 56-120528, in which while a core rod is rotated and moved along lengthwise directions, the rod is vibrated for the formation of glass particles. Moreover, Japanese Laid-open Patent Application No. 53-70449 has proposed a method of blowing glass fine particles against a core glass rod wherein a thin oxyhydrogen flame burner whose slit extends as having substantially the same width as the length of the core glass rod, or a burner array having a number of oxyhydrogen flame burners transversely arranged in line are used for the blowing without movement thereof. In addition, Japanese Laid-open Patent Application No. 64-9821 proposes a method wherein a porous glass matrix is prevented from crazing by controlling the feed of a gas from a plurality of burners or by controlling the distance between the level of the plural burners and the deposition level of soot, or by controlling the revolutions of a heat-resistant substrate to cause a deposition density of the soot to be changed along radial directions.

However, these known methods are not always satisfactory in many respects. More particularly, the method set out in the Japanese Laid-open Patent Application No. 49-84258 makes use of only one burner unit, with the attendant problem that the deposition rate of the soot or fine particles of glass is low and that where a long preform with a large diameter is prepared, the E quantity of heat becomes so short that the resultant deposited silica layer has low mechanical strength, thereby involving crazing occasion. Although the methods proposed in the Japanese Laid-open Patent Application Nos. 56-120528, 57-183330 and 58-9835 are advantageous in that the core layer and the clad layer can be formed by one step, the core and clad layers are so low in density that it is difficult to handle when an elongated preform with a large diameter is formed. These methods are also disadvantageous in that the fabrication apparatus becomes large in size and that when the core whose distribution of refractive index is not known is deposited with the clad layer, the resultant product may have characteristic properties which are outside the ranges of intended values.

The method of the Japanese Laid-open Patent Application No. 53-70449 is disadvantageous in that it cannot be guaranteed that the gas blown out from the slit of a burner can be maintained under the same conditions throughout the overall length of a glass rod serving as a core. This causes a deposit to be irregular at portions of individual burners or between adjacent burners. In fact, the resultant preform matrix has a poor accuracy with respect to the thickness of the deposit. With the method set out in the Japanese Laid-open Patent Application No. 64-9821, the deposition rate is high and a large-sized preform can be formed, but a burner is reciprocated at a given amplitude in the lengthwise directions, so that the burner is stopped at a given position and then moved to and stopped at another position, and returned to the given position. This reciprocation is invariably repeated between the two stop positions, thereby causing irregularities of deposition on the core. More particularly, the resultant preform has a deposit whose surfaces are irregular. In addition, aluminum used as a core material is undesirably doped in the silica layer as a metal impurity. Thus, this method cannot be utilized for the preparation of an optical fiber matrix.

For the preparation of a large-sized optical fiber preform at a high speed by use of a plurality of burners, Japanese Laid-open Patent Application No. 3-2288454 has proposed a method wherein a plurality of burners of the same design are located at equal intervals and the starting position of the reciprocating movement of the burners is changed every reciprocating cycle. This method has the advantage that the deposition rate remarkably increases, but with a serious problem that the amount of a deposit becomes non-uniform along the lengthwise direction.

SUMMARY OF THE INVENTION

It is accordingly an object of the invention to provide a method for making an optical fiber preform which can overcome the problems or disadvantages of the prior art counterparts.

It is another object of the invention to provide a method for making an optical fiber preform in which a deposition rate remarkably increases and which ensures a uniform amount of a deposit along the lengthwise direction of a core rod.

It is a further object of the invention to provide an apparatus for making an optical fiber preform.

The above objects can be achieved, according to one embodiment of the invention, by a method for making an optical fiber preform which comprises:

depositing fine particles of glass serving as a clad on the surfaces of a rod-shaped core over a given length of the rod-shaped core by use of a plurality of oxyhydrogen flame burner units;

detecting an amount of the resultant deposit to check uniformity in the amount of the deposit along the lengthwise direction of the rod-shaped core during the course of the deposition;

further depositing fine particles of glass on any surface portion of the rod-shaped core within the given length from at least one burner unit other than the plurality of burner units to correct the amount of the deposit over the given length based on the results of the detection; and dehydrating and firing the fine particles of glass after the deposit has reached a predetermined thickness.

The fine particles or soot is deposited on the rod-shaped core by use of a plurality of oxyhydrogen flame burner units through dehydration of a starting vapor phase glass material, The correction of the amount along the lengthwise direction of the core is made using at least one burner unit which is movable irrespective of the plurality of burner units, high-speed and reliable deposition is thus ensured.

According to another embodiment of the invention, there is also provided an apparatus for making an optical fiber preform, which comprises:

means for fixedly holding a rode-shaped core and capable of rotating the rod-shaped core;

a partial traverse shaft which is arranged in parallel to the rod-shaped core, has a plurality of oxyhydrogen flame burner Its fixed thereon, and is capable of moving the plurality of burner units along the lengthwise directions of the rod-shaped core so that fine particles of glass from the plurality of oxyhydrogen flame burner units are deposited on the rod-shaped core at a given length thereof;

an overall traverse shaft which is arranged in parallel to the rod-shaped core, and has monitoring means for detecting a deposited amount of the fine particles on the rod-shaped core along the lengthwise direction thereof; and another overall traverse shaft which is arranged in parallel to the rod-shaped core and is kept apart from the partial traverse shaft, and has at least one burner unit capable of moving along the lengthwise directions of the rod-shaped core to correct the deposited amount based on the results of the detection of the monitoring means.

The partial traverse shaft has a plurality of burner units fixed thereon and capable of partially traversing the plurality of burner units by the movement thereof along the lengthwise directions so that the fine particles are deposited on the rod-shaped core over the given length from gas streams blown out from the plurality of burner units. The overall traverse shaft having at least one burner unit fixed thereon and capable of traversing the at least one burner unit along the lengthwise directions of the rod-shaped core throughout the given length. The amount of the deposition along the lengthwise direction is corrected based on the results of the detection of the amount from the monitoring means.

The plurality of burners should preferably be not smaller than five burner units provided that the given length is in the range of 600 to 3000 mm and the plurality of oxyhydrogen burner units, respectively, have a tip nozzle with its outer diameter of from 20 to 70 mm. It will be noted that the term "given length" used herein, in fact, means an effective length of a preform.

The amount of the deposit is preferably measured as an outer diameter of the deposit by an appropriate means.

DETAILED DESCRIPTION OF THE INVENTION

Figure 1:
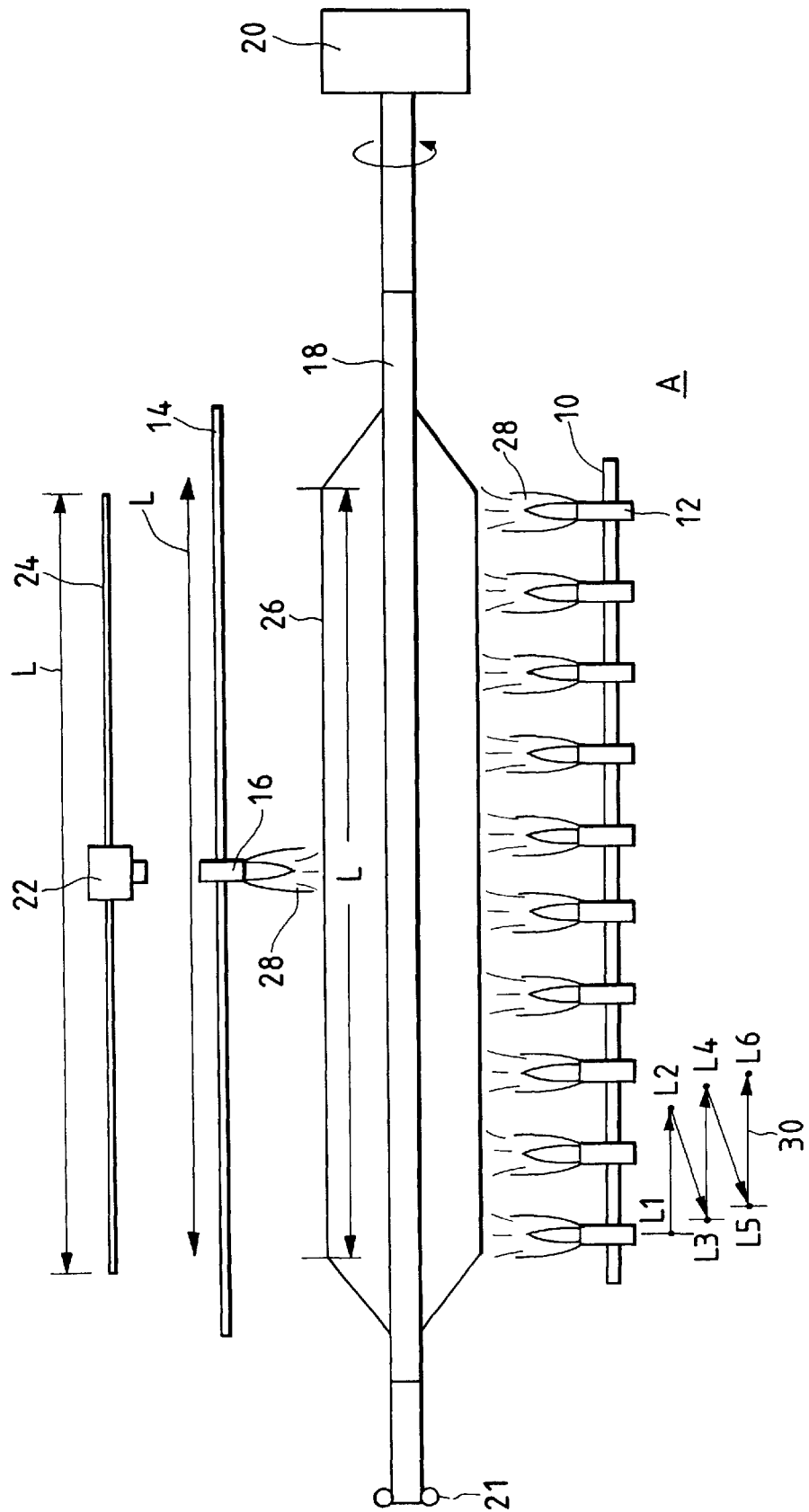
FIG. 1 is a schematic sectional view showing an apparatus for carrying out a method for making an optical fiber preform according to the invention.

Reference is now made to the accompanying drawing. In FIG. 1, there is schematically shown an apparatus A for making an optical fiber perform. The apparatus A includes a partial traverse shaft 10 fixedly holding a plurality of burner units 12 as shown, and an overall traverse shaft 14 fixedly holding a single burner unit 16. The shafts 10 and 14 are kept away from and in parallel to each other. A rod-shaped core 18 is placed between the shafts 10 and 14 and is fixed at one end thereof with means 20 for holding and rotating the core 10, and is ratably held such as with rollers 21 at the other end thereof A monitoring means 22 for detecting an amount of deposition of fine particles or a soot of glass is placed above the overall traverse shaft 14 and is fixed on another overall traverse shaft 24.

In operation, while the rod-shaped core 18 is rotated, for example, at 1 to 100 r.p.m. by the means 20, a gas stream is blown against the core 18 from each of the plurality of burner units 12 on the partial traverse shaft. 14 to permit fine particles of glass to be deposited about the core 18 over a given length L, thereby forming a deposit or soot body 26 made of the fine particles on the core 18 having the given length L. This length becomes an effective length of a preform. The partial traverse shaft 14 is moved to traversely move the plurality of burner units fixed thereon in opposite directions from an initial point by a given distance and then return to the initial point. This moving and returning cycle, i.e. a reciprocating cycle, is preferably completed within a time of 5 to 60 seconds per cycle. The given distance is preferably in the range of 150 to 450 mm, i.e., the partial traverse shaft 14 is moved by a distance of 150 to 450 mm during the reciprocating cycle.

Preferably, the reciprocating movements of the plural burner units are carried out in the following manner. As is particularly shown in FIG. 1 wherein a left-side burner unit 12' as viewed in the figure is used only for illustration, the burner unit 12' starts to move from point L1 to point L2. The distance between the points L1 and L2 is a traverse length of the burner 12'. Then, the burner 12' is returned to a point L3 which is deviated from the initial point L1 as shown. In a next cycle, the burner 12' is moved from the point L1 to point L4. Likewise, the burner 12' stopped at the point L4 is returned to a point L5, and then moved from the point L5 to a point L6. Thereafter, the burner 12' may be returned to the initial point L1, followed by repetition of the above reciprocating cycles. Alternatively, the burner 12' may be turned back in reverse cycles of L6 to L5, L5 to L4, L4 to L3, L3 to L2 and L2 to L1. Although only three starting points, L1, L3 and L5 are depicted in the figure, the starting points may be changed up to several to several tens of points.

In these cycles the distances between L1 and L2, L3 and L4, and L5 and L6 are made equal to each other. In the reciprocating cycles, the center of the shaft 10 is preferably moved by a distance in the range of 150 to 460 mm as mentioned before. This distance corresponds to a distance between L1 and L6 in the figure if the point L6 is determined as a final traverse point. A distance 30 between L1 and L2 may be in the range of from 100 to 250 mm. This partial traversing is particularly described in the afore-mentioned Japanese Laid-open Patent No. 3-228845. Needless to say, the other burner units fixedly set on the shaft 10 are subjected to similar reciprocating cycles although the respective initial starting points are deviated from one another.

In this way, the fine particles are deposited as 26 on the rod-shaped core 18. During the course of the deposition or after completion of the deposition, the amount of the deposit 26 throughout the given length of the core 18 is checked or detected by the means 22 set on the overall traverse shaft 24. The means 22 includes, for example, a CCD camera. When using the CCD camera, the amount is measured as an outer diameter of the deposit. The data of the outer diameter is processed in and red back from an appropriate computing system (not shown), such as CPU (central processing unit), to the overall traverse shaft 24, so that the burner unit 16 set on the shaft 14 is moved along the lengthwise directions to correct any variation of the outer diameter along the lengthwise direction of the deposit, thereby ensuring the uniformity of the outer diameter of the deposit 26.

The thus formed deposit-bearing core 18 is dehydrated and fired at high temperatures of 500 to 1400° C. for 10 to 36 minutes to obtain an optical fiber preform by a usual manner.

The rod-shaped core 18 used in the practice of the invention should comprise a core portion of an intended optical fiber preform matrix made, for example, of quartz. Alternatively, the core 18 may be made of a target rod consisting, for example, of alumina, on which quartz is vacuum deposited in a thickness of 20 to 700 mm. In this Base, the alumina rod has to be pulled out after completion of deposition glass fine particles.

Preferably, the core 18, in either case, should have a profile of a graded index type or a single mode type made according to any of known VAD, OVD and MCVD methods and should also have a clad layer having a certain thickness, for example, of 50 to 300 mm Moreover, it is preferred that the structural parameters of the core 18, such as a refractive index after vitrification, a dimension and the like, should be preliminarily confirmed by measurement. The rod-shaped core should preferably be finished as having a variation of an outer diameter of ±5% over the overall length thereof, cleaned with an alcohol, such as ethanol, and finally fire-polished. The rod-shaped core 18 should preferably have an outer diameter of 20 to 70 mm and a length of 1500 to 3900 mm The partial traverse shaft 10 having a plurality of burner units 12 is arranged in parallel to the rod-shaped core 18. Using the plurality of burner units, the fine particles of glass can be deposited at a high speed. To this end, when the given length of the core 18 on which the fine particles are to be deposited is in the range of 600 to 3000 mm and the plurality of burner units, respectively, have a tip nozzle with its outer diameter of 20 to 70 mm, five or more burner units are preferably used in order to obtain a satisfactory deposition rate of 2,000 to 10,000 g/hour.

The burner units 12 may be densely set on the shaft 10 and, thus, the maximum number of the burners depend on the length of the shaft 10 and the setting intervals of the burner units. Usually, 5 to 40 burner units are employable. In practice, the distance between adjacent burner units on the shaft 10 is in the range of 50 to 200 mm. As defined before, the effective length of a preform is in the range of 600 to 3000 mm, the length of the partial traverse shaft 10, on which a desired number of burner units but not less than five burner units are set, may be changed in the range of 0.5 to 1 time the length of a preform.

In order to reduce the interference of flames 28 from adjacent burners 12, the space between the adjacent burners should preferably be determined within a range of 1.5 to 2.5 times the size of the flame spread on the deposit surface. Although the spread of the flame increases with an increase of the deposition, the space or distance between the adjacent burners should preferably be determined based on a final outer diameter of the deposit from the standpoint of a deposition efficiency.

The starting material used to provide the fine particles of glass includes, for example, $SiCl_4$, $Si(CH_3)Cl_3$ and the like, of which $SiCl_4$ is preferably used owing to the ease in availability and the inexpensiveness. The starting material is fed in the form of a gas along with a carrier gas and is hydrolyzed with an oxyhydrogen flame 28. The resultant soot or particles of glass are deposited on the rod-shaped core 18. The oxyhydrogen flame 28 can be appropriately generated by feeding a starring gas along with a carrier gas of oxygen and hydrogen. For appropriate deposition, a starting gas is fed at a rate of 1 to 100 g/minute along with 2 to 300 liters/minute of oxygen and 10 to 300 liters/minute of hydrogen.

As mentioned before, the monitoring means 22 for detecting the amount of the deposit 26 on the rod-shaped core 18 along the lengthwise direction of the core 18 may be a CCD camera, with which an outer diameter of the deposit is determined and an amount of the deposit can be calculated from the outer diameter.

The CCD camera should be movable along the shaft 24 over the overall length of the deposit to determine the outer diameter of the deposit along the overall length thereof until the deposition is completed. The value of the outer diameter is transmitted, for example, to a central processing unit, with which a difference from a preset value in any portion of the preform is determined. Based on the difference along the deposit, the flow rate of fine particles of glass from the burner 16 or the moving speed of the burner 16 is controlled to correct the difference in any portion of the deposit thereby obtaining a preform which is uniform throughout the preform.

The burner unit 16 is depicted as a single unit, a plurality of burner units may be used. In this case, individual units are separately controlled with respect to the flow rate of a starting gas.

The control in amount of the fine particles of glass particularly with a single burner unit 16 is feasible in different ways including (1) a method wherein the feed of a starting gas to the burner unit is changed, (2) a method wherein the moving speed of the burner unit is changed, and (3) a method wherein the feed of the starting gas to the burner unit and the moving speed of the burner unit are both changed.

In the method (1), where the amount of the glass fine particles to be adjusted is increased, the feed of a starting gas to the burner is increased. On the contrary, where it is necessary to reduce the amount, the feed of a starting gas is decreased. In this method, the amount of a carrier gas is changed so that the density of the resultant deposit is not changed.

In the method (2), where the amount of the glass fine particles is increased for the adjustment, the moving speed of the burner is decreased. In contrast, where the amount is decreased, the moving speed of the burner is increased. In the method (2), care should be paid to the change of the density of a deposit by changing the moving speed.

In the method (3), the above methods (1) and (2) are combined.

The feed of a starting gas has been defined above, and the moving speed of the burner is generally in the range of from 30 to 300 mm/minute.

In this way, the deposition of the fine particles is continued until the deposit has an outer diameter of from 120 to 67-mm. In the practice of the invention, the variation in the outer diameter of the deposit can be controlled within a range of ±1 mm.

The invention is more particularly described by way of examples. Comparative Example is also described.

EXAMPLE 1

Using the apparatus of the type shown in FIG. 1, a core rod 18 made of quartz and having an outer diameter of 50 mm and a length of 1500 mm was provided. Ten burner units 12 each having a tip nozzle with an outer diameter of 35 mm were set on the partial traverse shaft 10 disposed in parallel to the rod 18 at intervals of 150 mm. The partial traverse shaft was partially traversed by a traverse distance 30 of 180 mm while shifting a start point by a given distance in every cycle until the center of the partial traverse shaft was moved to 200 mm in maximum. The feed of a starting $SiCl_4$ gas was 250 g/minute. AS a result, there was deposited a soot 26 made of fine particles of glass serving as a clad around the rod 18. A CCD camera 22 (commercially available from Sony Co., Ltd., under, the designation of XC-77) which was set on another overall traverse shaft 24 was used to measure an outer diameter of the deposit or soot body 26 along the lengthwise direction.

Simultaneously with the deposition by use of the partial traverse shaft 3, a soot was further applied from the burner unit 22 having an outer diameter of 35 mm and set on an overall traverse shaft 14 while controlling a flow rate of the starting $SiCl_4$ gas based on the results of the measurement of the outer diameter using the CCD camera 22, thereby obtaining the soot body 26 having an outer diameter of 350 mm ±1 mm. In this case, while the moving speed of the burner unit 22 was made constant, the flow rate of the starting gas was changed to correct the outer diameter during the course of the deposition. This soot body was dehydrated and fired under conditions of 800° C. and 24 hours to obtain a preform. The preform was subjected to measurement of a variation of cut-off wavelength, λc, along the lengthwise direction, revealing that the variation was ±2%.

EXAMPLE 2

The general procedure of Example 1 was repeated except that while a flow rate of $SiCl_4$ fed to the burner unit 16 was maintained constant, the moving speed of the burner unit 16 was changed for the correction, thereby obtaining a soot body having an outer diameter of 350 min ±1 mm. This body was dehydrated and fired in the same manner as in Example 1 to obtain a preform. When the preform was subjected to measurement of a variation of cut-off wavelength, λc, along the lengthwise direction, revealing that the variation was ±1.5%.

Comparative Example

The general procedure of Example 1 was repeated except that any overall traverse shaft was not used but the partial traverse shaft alone was used, thereby forming a soot body having an outer diameter of 360 mm ±1 mm. The soot body was dehydrated and fired, and the resultant preform was subjected to measurement of a variation of cutoff wavelength, λc, along the lengthwise direction, revealing that the variation was ±5%.

What is claimed is:

1. A method for making an optical fiber preform which comprises:

depositing fine particles of glass serving as a clad on the surfaces of a rod-shaped core over a given length of the rod-shaped core by use of a plurality of oxyhydrogen flame burner units;

detecting an amount of the resultant deposit to check uniformity in the amount of the deposit along the lengthwise direction of the rod-shaped core during the course of the deposition;

further depositing fine particles of glass on any surface portion of the rod-shaped core within the given length from at least one burner unit other than the plurality of burner units to correct the amount of the deposit over the given length based on the results of the detection; and dehydrating and firing the fine particles of glass after the deposit has reached a predetermined thickness.

2. A method according to claim 1, wherein the amount is detected by measuring an outer diameter of the deposit.

3. A method according to claim 1, wherein the amount of the deposit is corrected along the lengthwise direction of the rod-shaped core by changing a feed of a starting gas to said at least one burner unit.

4. A method according to claim 1, wherein the amount of the deposit is corrected along the lengthwise direction of the rod-shaped core by changing a moving speed of said at least one burner unit.

5. A method according to claim 1, wherein the amount of the deposit is corrected along the lengthwise direction of the rod-shaped core both by changing a feed of a staring gas to said at least one burner unit and by changing a moving speed of said at least one burner unit.

6. A method according to claim 1, wherein the amount is measured as a thickness of the deposit.

7. An apparatus for making an optical fiber preform, which comprises:

means for fixedly holding a rod-shaped core and capable of rotating the rod-shaped core;

a partial traverse shaft which is arranged in parallel to the rod-shaped core, has a plurality of oxyhydrogen flame burner units fixed thereon, and is capable of moving the plurality of burner units along the lengthwise directions of the rod-shaped core so that fine particles of glass from the plurality of oxyhydrogen flame burner units are deposited on the rod-shaped core at a given length thereof;

an overall traverse shaft which is arranged in parallel to the rod-shaped core, and has monitoring means for detecting a deposited amount of the fine particles on the rod-shaped core along the lengthwise direction thereof; and another overall traverse shaft which is arranged in parallel to the rod-shaped core and is kept apart from the partial traverse shaft, and has at least one burner unit capable of moving along the lengthwise directions of the rod-shaped core to correct the deposited amount based on the results of the detection of the monitoring means.

8. An apparatus according to claim 7, wherein the plurality of oxyhydrogen flame burner units are placed at intervals which are, respectively, within a range of 1.5 to 2.5 times the flame spread substantially on the surface of a final deposit.

9. An apparatus according to claim 7, wherein the plurality of oxygen flame burner units consists of five or more oxyhydrogen flame burner units provided that the given length is in the range of 600 to 3000 mm and the plurality of oxyhydrogen burner units, respectively, have a tip nozzle with its outer diameter of from 20 to 70 mm.

10. An apparatus according to claim 7, wherein said partial traverse shaft is capable of moving in such a way that a start point is changed by a given distance in every cycle until a predetermined number of cycles are completed.

* * * * *